Sept. 26, 1939.  C. R. DOWNS ET AL  2,174,186
AIR CONDITIONING APPARATUS
Filed May 14, 1935  7 Sheets-Sheet 1
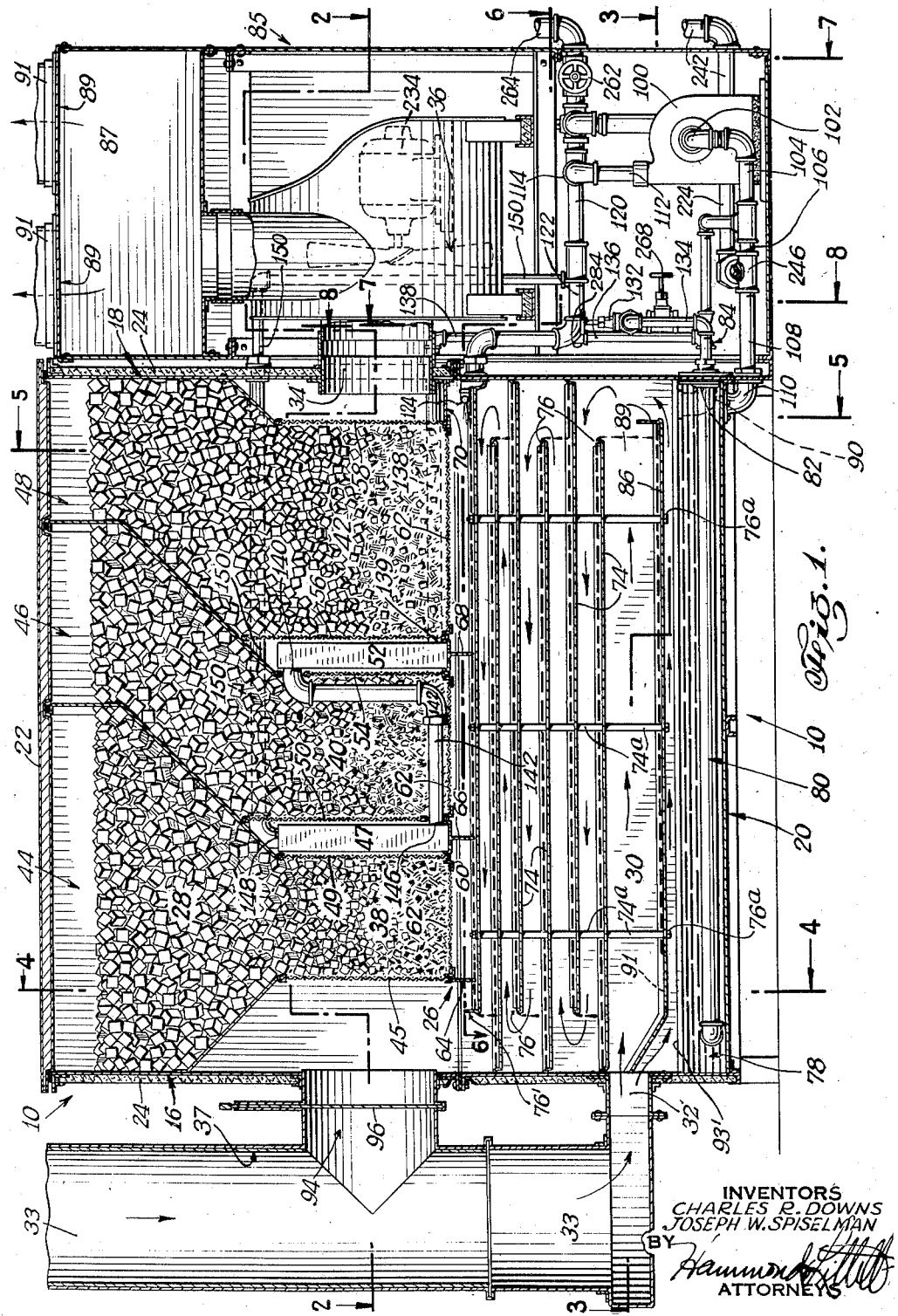
INVENTORS
CHARLES R. DOWNS
JOSEPH W. SPISELMAN
BY
ATTORNEYS

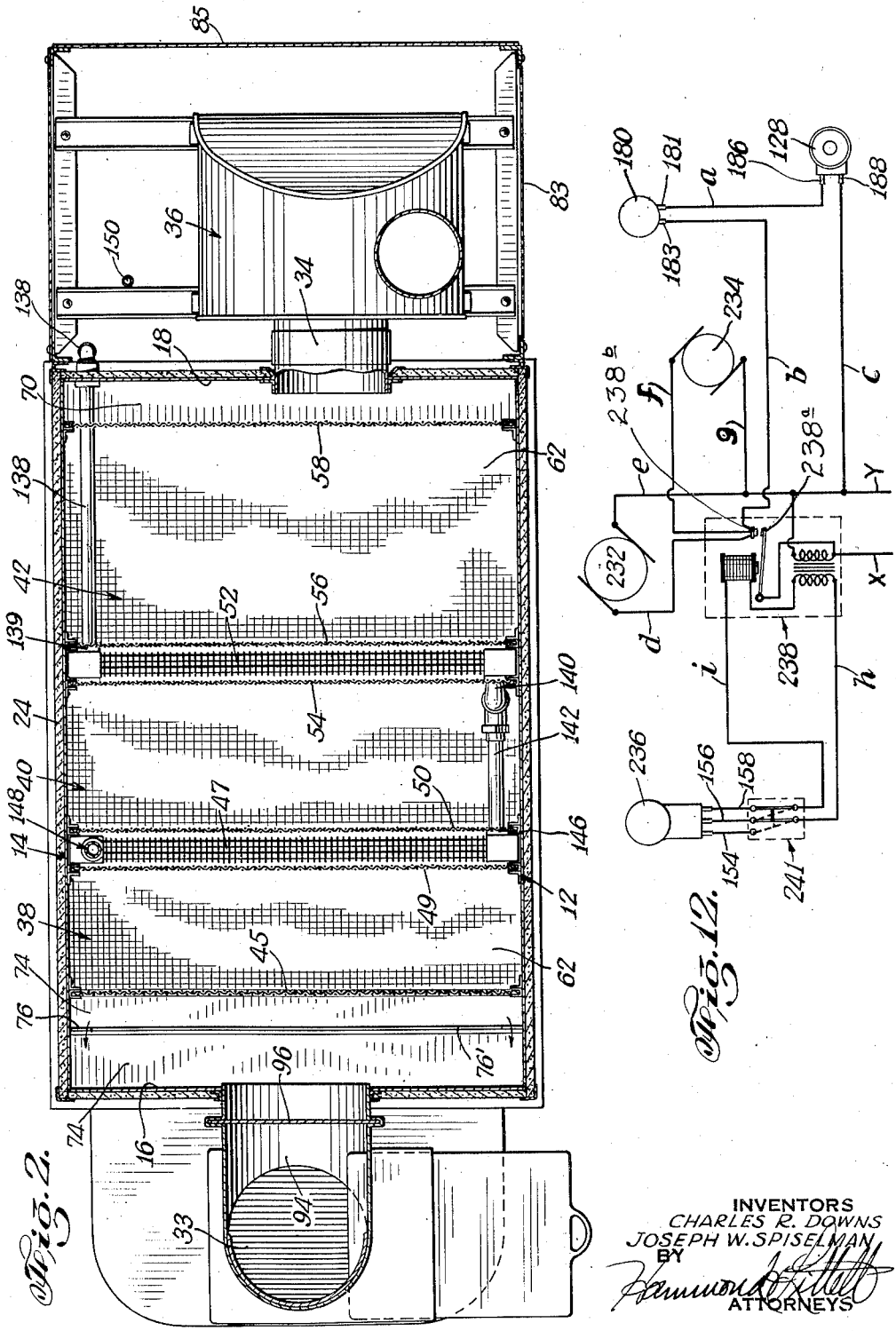

Sept. 26, 1939.  C. R. DOWNS ET AL  2,174,186
AIR CONDITIONING APPARATUS
Filed May 14, 1935  7 Sheets-Sheet 3
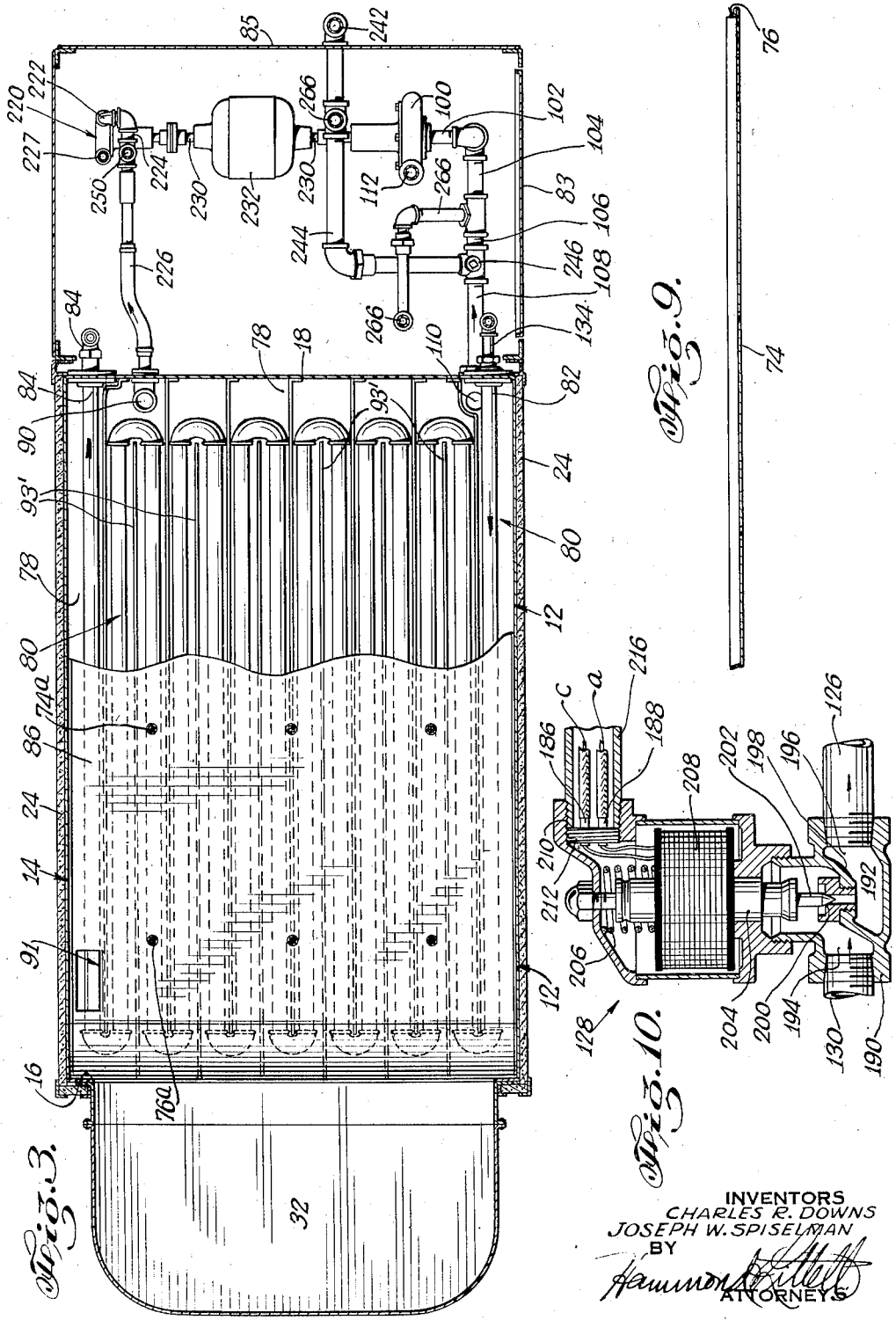
INVENTORS
CHARLES R. DOWNS
JOSEPH W. SPISELMAN
BY
ATTORNEYS

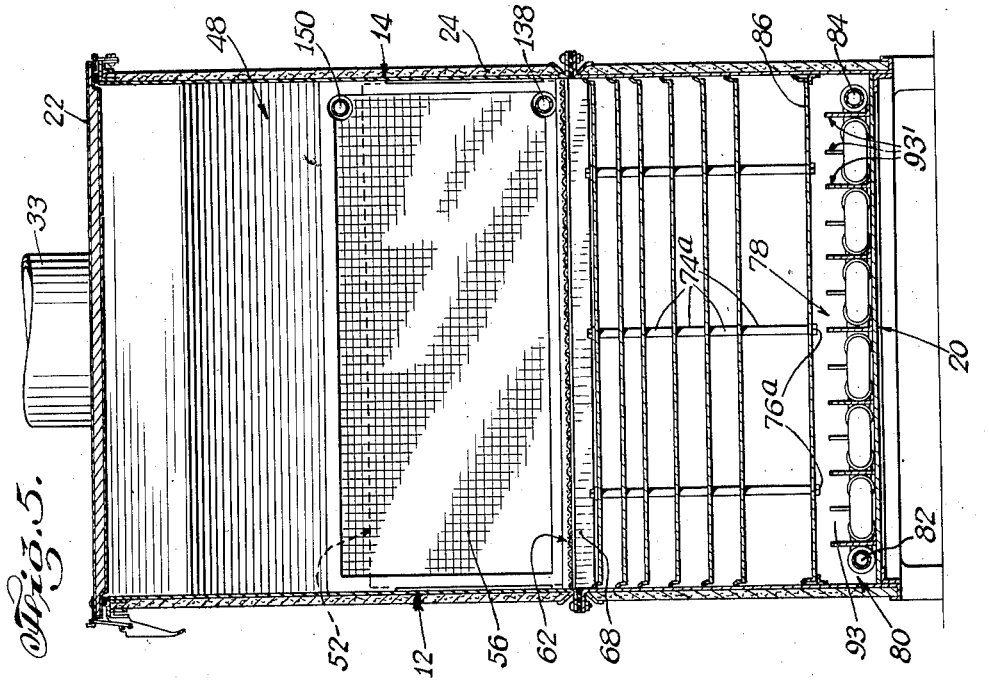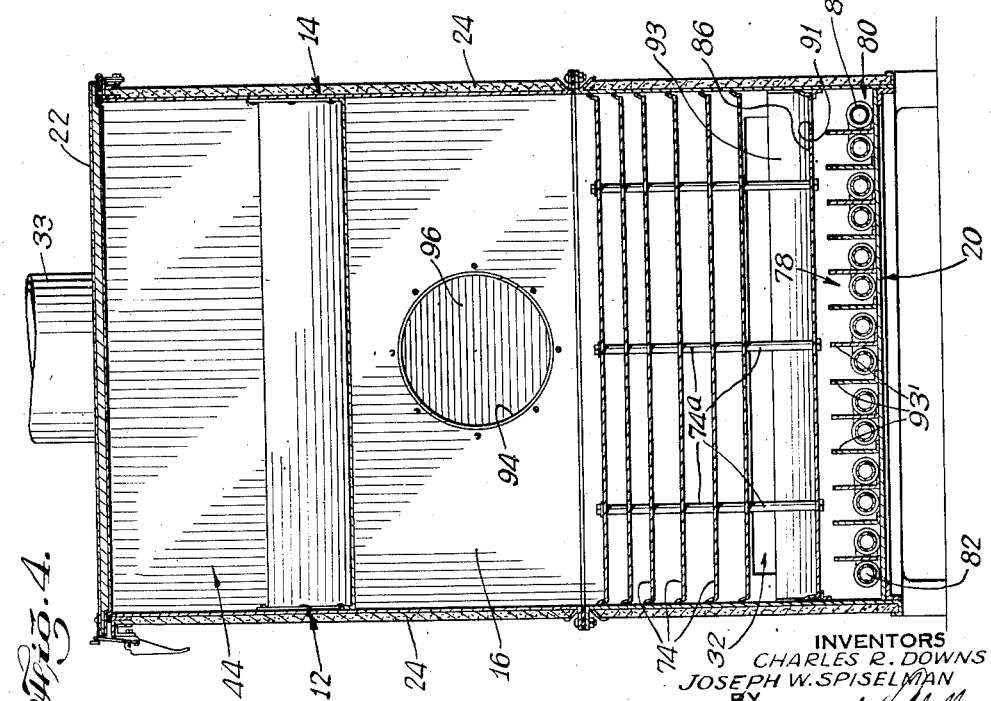

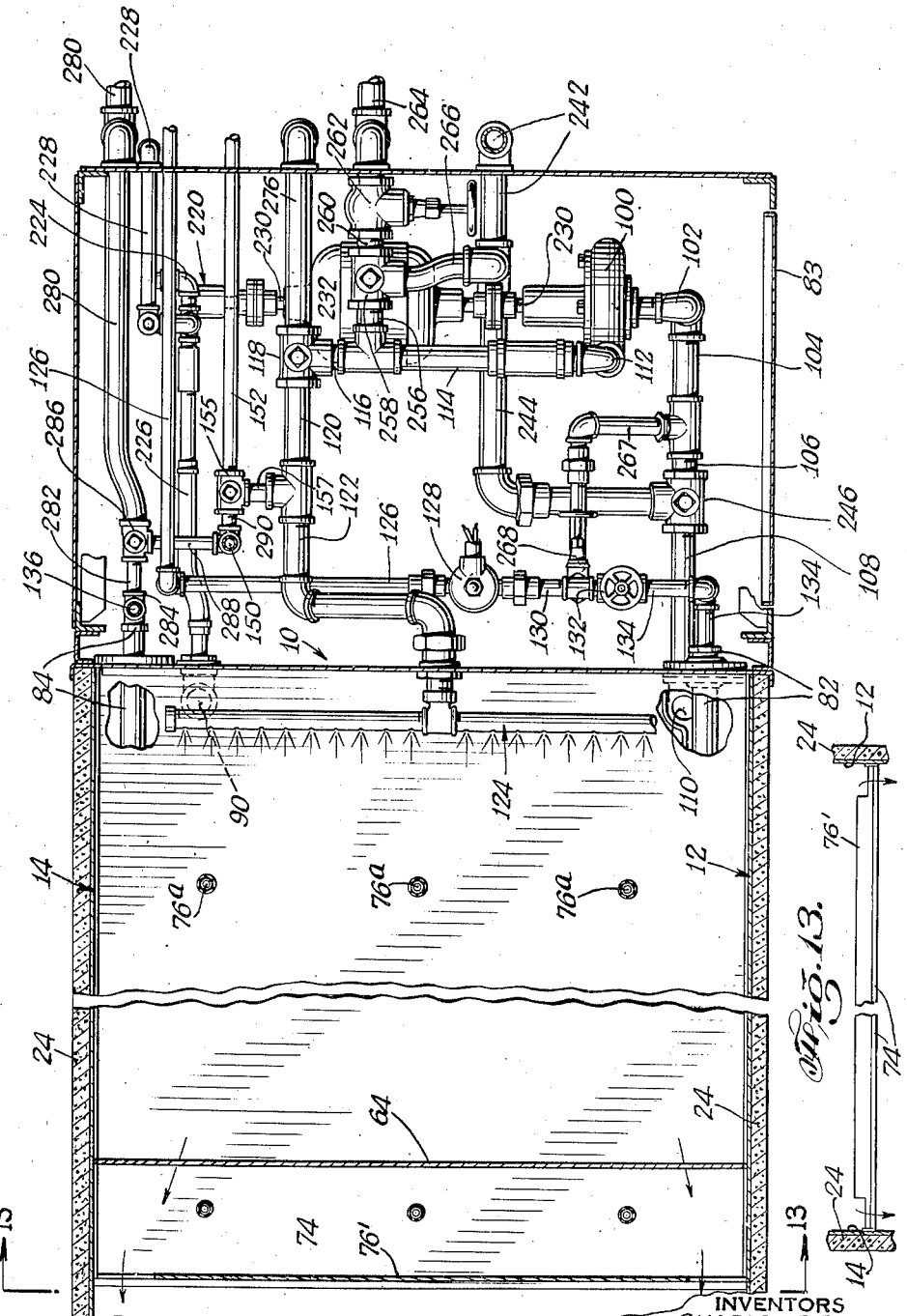

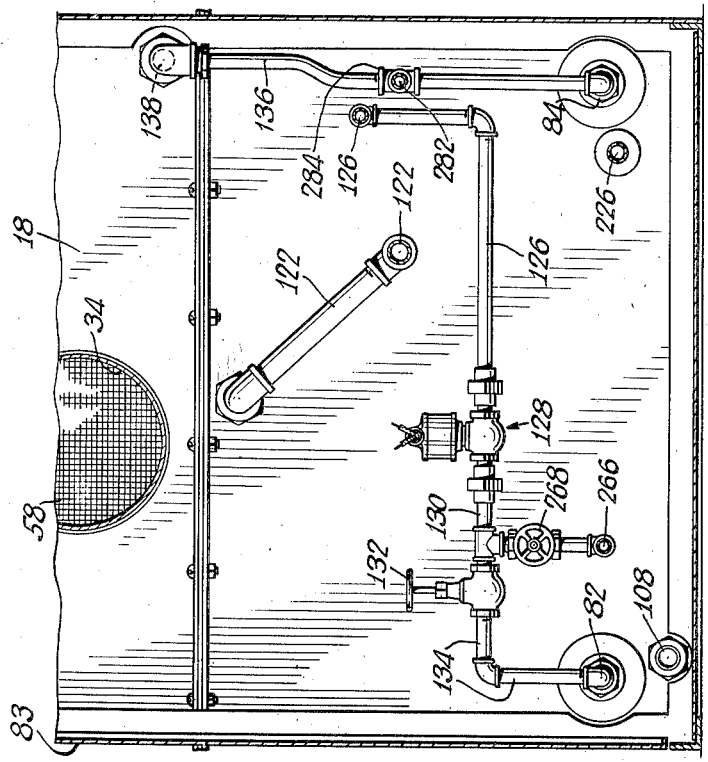
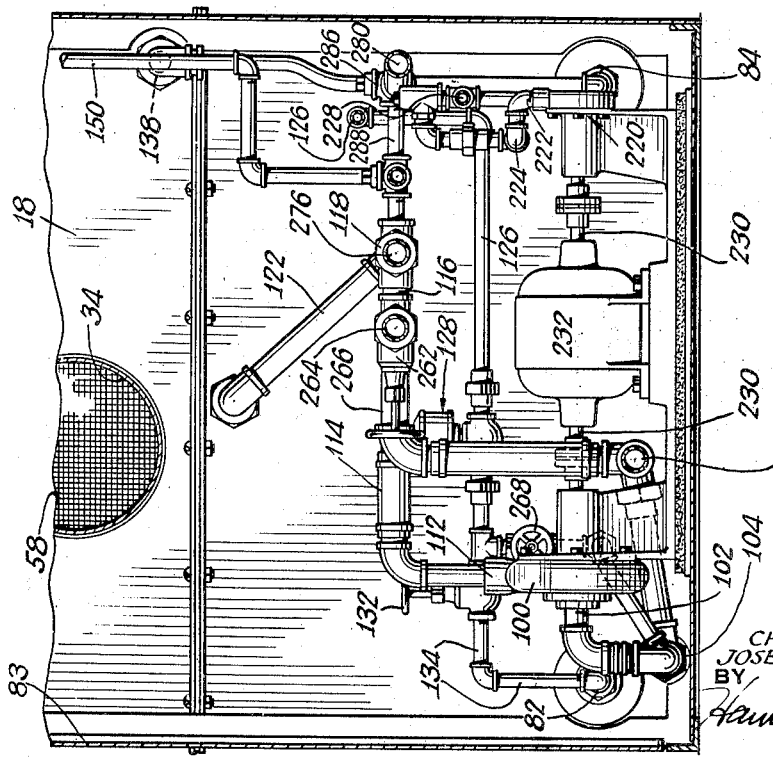

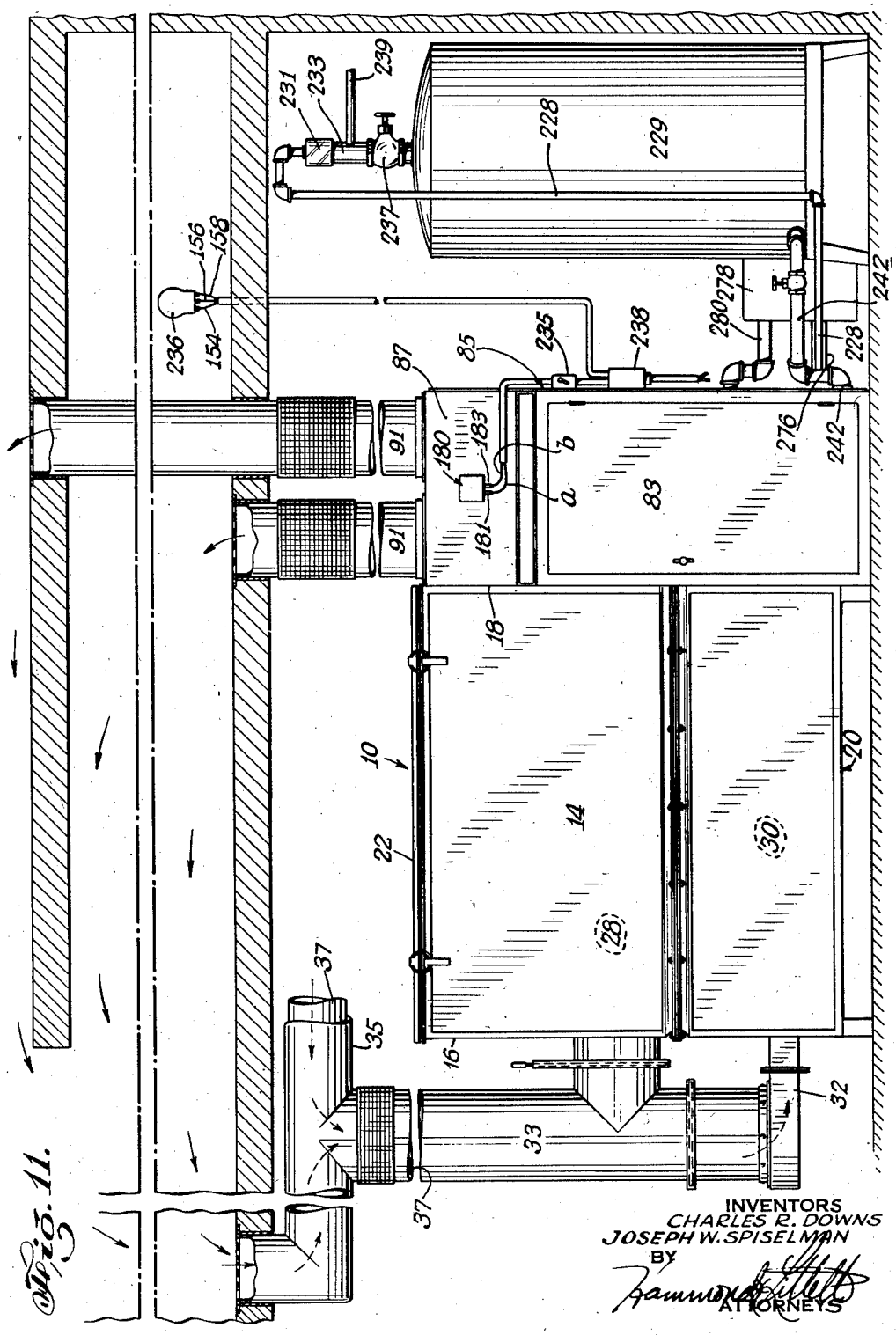

Patented Sept. 26, 1939

2,174,186

UNITED STATES PATENT OFFICE 2,174,186

AIR CONDITIONING APPARATUS

Charles R. Downs, Greenwich, Conn., and Joseph W. Spiselman, Brooklyn, N. Y., assignors, by mesne assignments, to The Calorider Corporation, Old Greenwich, Conn., a corporation of Connecticut Application May 14, 1935, Serial No. 21,326

11 Claims. (Cl. 183—4)

This invention relates to an air or gas conditioning apparatus and operating control therefor.

The object of the invention is to provide an air and gas conditioning apparatus and method of operating the same which will have a high operating efficiency, with a low original cost and low operating costs, and to provide automatically operating means for controlling the operation and for maintaining the apparatus in service. The present apparatus embodies several improvements on that disclosed in the copending application of Charles R. Downs, Serial No. 672,415, filed May 23, 1933, now Patent No. 2,026,936, granted January 6, 1936.

One of the objects of the invention is to provide an apparatus of the type disclosed in the above mentioned application in which air may be dehumidified, for conditioning air within an enclosed space with or without cooling said enclosed space during hot summer weather and which may be converted for use in humidifying air in the enclosed space with or without heating said enclosed space by the apparatus during cold winter months. In carrying out this object, the apparatus is so designed that the required changes from summer to winter operation or vice versa, may be accomplished in a very short time and without structural changes in the equipment.

Another object of the invention is to provide an air conditioning apparatus which, for dehumidification purposes, depends upon a solid deliquescent material for its drying effect and which is provided with a liquid phase drying zone and a solid phase drying zone, means being provided whereby air to be conditioned obtained from within or without the enclosed space, may be passed in series through these zones and then discharged to the space to be conditioned, and means also being provided whereby these zones, upon conversion of the apparatus for winter use, are changed into a liquid phase humidifying zone followed by an air heating zone whereby humidified air below its saturation point may be discharged into the space to be conditioned.

In the use of the apparatus for humidification, provision may be made for passing air from within the enclosed space directly into both zones in series parallel relation and for subsequent mixing of the humidified air with dry or untreated air in the heating zone. Thus in summer use, the passing of the air in series through the drying zones effects maximum drying of the air to be conditioned, while in winter use the series parallel passage of air through the converted zones effects humidification and heating, while at the same time, due to the addition of dryer air to, and the mixing of this dry air with, the humidified air, the conditioned air is discharged into the enclosed space, preferably at a temperature approximating that at which the enclosed space is to be maintained, and at a humidity which is always below the saturation point and condensation of moisture in the ducts or adjacent the outlets is avoided. Furthermore, the relative humidity of the air discharged into the enclosed space is sufficiently low to lessen the likelihood of moisture condensing on cold windows and walls in the vicinity of the air discharge openings into the enclosed space.

Another object of the invention is to provide an air conditioning apparatus capable of dehumidifying the air within an enclosed space and which depends for its dehumidifying effect upon the exchange of moisture and heat between the air and a deliquescent substance, such as calcium chloride, and a series of cooling coils and to provide means whereby the temperature of the conditioned air leaving the apparatus is controlled by automatically rendering the cooling coils operative when the discharge air temperature exceeds a certain maximum and causing the cooling coils to be again rendered inoperative when the temperature of the said conditioned air falls below a certain predetermined minimum.

Another object of the invention is to provide an apparatus which in hot weather operates to dehumidify air within an enclosed space, means being provided for rendering the entire apparatus inoperative when the air within the enclosed space is reduced to a predetermined degree of humidity and to automatically start the apparatus when the humidity within the enclosed space rises above a predetermined degree. Similarly, an object of the invention is to provide an apparatus which in cold weather operates to humidify air within an enclosed space, means being provided whereby the entire apparatus is rendered inoperative when the humidity of the air within the enclosed space reaches a predetermined maximum and to automatically start the apparatus and maintain it in operation when the humidity falls below a predetermined degree of relative humidity.

Another object of the invention is to provide an air conditioning apparatus which employs a solution of calcium chloride for drying effect and which employs a pumping system for circulation of such solution and which is provided with means whereby this pumping system may be temporarily used for pumping the solution to a storage or to a discharge point, or for bringing the same from storage into the apparatus, and also for circulating heated water in the apparatus in the absence of a drying medium when the apparatus is employed for humidification purposes.

Another object of the invention is to provide an apparatus which is designed to humidify air by the withdrawal of water from a reservoir, heating the water and contacting it with the air, means being provided for regulating and removing to waste a small portion of the water from the reservoir while simultaneously replenishing the same to keep down deposition of salt in the apparatus and facilitate heat transfer therein.

Another object of the invention is to provide a dehumidifying method and apparatus wherein congelation of concentrated deliquescent solution within or dripping from a bed of solid deliquescent material through which air is passed for the purpose of dehumidification, is prevented so that the apparatus does not become clogged from congelation of the solution of the deliquescent material.

Another object of the invention is to provide an air conditioning apparatus including a liquid phase drying zone in which there is contained a liquid drying agent and a solid phase drying zone in which there is contained a bed of a solid drying agent through which zones air is passed in series in the order named, means being provided in the liquid phase zone for causing the air passing therethrough to entrain particles of the liquid drying agent, and means also being provided for preventing the air from carrying such entrained particles into the solid phase drying zone to prematurely liquefy the solid drying agent.

Various other objects and advantages of the invention will be apparent as the embodiments thereof are described more in detail.

In the form of embodiment of the invention herein illustrated:

Figure 1 is a vertical longitudinal section of the air conditioning apparatus proper comprising the present invention, Figure 2 is a horizontal sectional view taken substantially along the line 2—2 of Figure 1, Figure 3 is a horizontal sectional view taken substantially along the line 3—3 of Figure 1, Figure 4 is a vertical transverse sectional view taken substantially along the line 4—4 of Figure 1, Figure 5 is a vertical transverse sectional view taken substantially along the line 5—5 of Figure 1, Figure 6 is a horizontal sectional view taken substantially along the line 6—6 of Figure 1, Figure 7 is a vertical transverse sectional view taken substantially along the line 7—7 of Figure 1, Figure 8 is a vertical transverse sectional view taken substantially along the line 8—8 of Figure 1, Figure 9 is a sectional view taken longitudinally through one of a series of trays employed in connection with the present invention, Figure 10 is a longitudinal sectional view taken centrally through a solenoid valve employed in connection with the present invention, Figure 11 is a fragmentary sectional view of a typical dwelling house showing the assembled air conditioning apparatus together with its auxiliary equipment and controls, Figure 12 is a diagrammatic view showing one form of electrical wiring and control system employed in connection with the present invention, and Figure 13 is an end view of a liquid holding tray employed in connection with the present invention.

The air conditioning unit shown for the purposes of illustrating our invention comprises a rectangular casing 10 having side walls 12 and 14, end walls 16 and 18, a bottom 20, and a cover or top 22 which is hinged to the casing 10. The side walls 12 and 14 and the end walls 16 and 18 are preferably formed of sheet metal and suitably galvanized or otherwise protected from corrosion. Sheets of heat insulating or decorative material 24 may be used to encase the casing 10.

Extending longitudinally through the chamber provided by the rectangular casing 10, and occupying a horizontal position in this chamber, is a partition 26 which is formed of several independent removable sections the function of which will be hereinafter described. This partition 26 divides the chamber into a solid phase drying compartment above, and a liquid phase drying compartment below, which compartments provide what are hereinafter referred to as a solid phase drying zone and a liquid phase drying zone respectively. Air to be conditioned is passed first through the liquid phase drying zone where it gives up a portion of its moisture, and subsequently through the solid phase drying zone where the remaining moisture is extracted therefrom.

The air enters the casing 10 through an inlet duct 32 leading from an air chute 33 and leaves the casing through an outlet duct 34 in the solid phase drying zone communicating with the discharge ducts 91. A blower or fan 36 serves to circulate the air through the conditioning unit 10 and the space to be conditioned.

In Figure 11, the air chute 33 is shown as communicating with an air conduit 35 which in turn communicates with the interior of the enclosed space, in this instance the first and other floors of the particular dwelling house or building in which the conditioning apparatus is installed, to withdraw air therefrom and the discharge ducts 91 communicate with the same spaces or floors to discharge conditioned air therein, the outlet and inlet of the ducts 91 and 35 being suitably spaced to secure circulation of the conditioned air through said spaces. In order to reduce vibration and to keep noises at a minimum, the air chute 33, and conduit 35 may be lined with a sound deadening material 37.

The solid phase drying zone 28 is provided with a series of compartments 38, 40 and 42, for receiving solid calcium chloride or other deliquescent material, preferably in the form of lumps or briquettes which are fed to the compartments from respective hoppers 44, 46 and 48. Air passing through the calcium chloride material gives up a portion of its moisture which causes liquefaction of the material so that the fragments of the material are reduced in size and as the lumps in the compartments 38, 40 and 42 settle, new material is automatically fed down from the hoppers 44, 46 and 48. The solid calcium chloride in the first compartment 38 is liquefied more rapidly than in the second compartment 40 and last compartment 42, so that the hoppers 44, 46 and 48 are proportioned so as to provide adequate supply to the respective compartments at approximately the rate it is used, so that the charge in the hoppers 44, 46 and 48 lasts about the same length of time.

The partially dehumidified air from the liquid phase zone enters the solid phase zone near the wall 16 of the casing 10 and passes through a screen 45 which supports the leading face of the mass of solid calcium chloride contained in the first compartment 38. Moisture in the air issuing from the liquid phase drying zone is absorbed by the lumps in the compartment 38 and additional moisture is removed from the air in its passage through this compartment. Interposed between the compartments 38 and 40 is a heat exchanger unit 47 having screens 49 and 50 on opposite sides thereof to keep the solid calcium chloride contained in these compartments from coming into direct contact with the same and to prevent liquefied material from flowing into the openings in the heat exchanger and congealing therein. A second heat exchanger unit 52 is interposed between the compartments 40 and 42 and this unit is similarly protected by screens 54 and 56 on opposite sides thereof. A screen 58 supports the solid calcium chloride in the compartment 42 to prevent the same from passing into the outlet duct 34 and removable screens 62 support the calcium chloride lumps at the bottom of the compartments 38, 40 and 42.

Air from the compartment 38 passes successively through the heat exchanger unit 47, the solid material in the compartment 40, the heat exchanger unit 52, the solid material in the compartment 42, the screen 58, and leaves the solid phase zone through the outlet duct 34.

The heat exchangers are preferably formed of finned tubing through which water, chilled brine or other cooling liquid or fluid is circulated while the air passing through the apparatus from one compartment to another comes in contact therewith to remove the heat due to condensation of moisture removed from the air, together with the heat of solution of the calcium chloride that has been liquefied. It has been our experience that dehumidification of the air without actual refrigeration or reduction of its initial temperature is generally all that is necessary to provide comfort and that dry air is more satisfactory than refrigerated air for normal summer conditions; therefore we prefer to use the heat exchange units 47 and 52 only to prevent increase in the temperature of the air and to remove the heat generated in the calcium chloride beds as the moisture is removed. For this purpose ordinary tap water or city water is usually sufficient. If desired, it is of course possible to circulate artificially cooled water or brine or the like, through the coils of the heat exchangers 52 and 47 to further reduce the temperature. By the provision of the heat exchangers 52 and 47, the average temperature of any one bed may be maintained at a progressively lower temperature than that of the preceding bed.

The partition 26 is sectional in form and comprises a plurality of angle pieces 60 which are secured to the lower edge of the screens 45, 49, 50, 54, 56 and 58. Removable screen bottoms 62 are received between the angle pieces 60 so as to rest loosely thereon and each screen its coextensive with the bottom of one of the compartments 38, 40 or 42 and comprises the sole support for the calcium chloride contained therein. In this way the drainage of the liquefied calcium chloride from the compartments 38, 40 and 42 is not interfered with and clogging of the apparatus due to congelation of the liquefied material is prevented.

The liquid phase drying zone 30 below the solid phase drying zone 28 is provided with a series of horizontal staggered trays 74 which are arranged in cascade relationship, so that a solution or other liquid admitted to the uppermost tray will flow downwardly in cascade fashion successively onto the succeeding lower trays, although any other way of securing circulation of air in contact with the liquid calcium chloride may be used. The edges of the trays 74 are fitted closely to the walls of the casing 10 in such a manner as to form substantially liquid and air tight joints and the free edges of the trays are provided with lips 76. In this manner a shallow pool of liquid is maintained on each tray while the overflow descends from tray to tray. The trays 74 are spaced apart by spacers 74a and are held together by the bolts 76a.

The uppermost tray 74 is slightly spaced from the partition 26 and extends forwardly of the partition 26 a slight distance at the forward end thereof. A plurality of baffles 64, 66 and 68 depend from the partition 26 to points slightly spaced from the upper tray 74 and, by dipping into the solution carried by this tray, provide a liquid seal for preventing air issuing from the liquid phase drying zone 30 from by-passing the solid phase zone or any portion thereof on its way to the outlet duct 34. A solid plate 70 connects the bottom of the screen 58 with the wall 18.

At the bottom of the zone 30 there is provided a reservoir 78 having a serpentine coil cooling unit 80 (shown in Figures 1 and 3) disposed therein. This cooling unit is in the form of a tortuous conduit having a water inlet 82 at one side of the reservoir 78 and a water outlet 84 at the other side thereof. The unit 80 is immersed in the solution of calcium chloride which collects in the reservoir 78 after passing over the trays 74. A partition 86 in the form of a tray extends over the reservoir 78 and is spaced from the end wall thereof. The rear edge of this partition 86 is provided with a lip 89 to prevent overflow of solution at this edge. The end of the partition 86 with the lip 89 extends forwardly in the apparatus a distance slightly greater than the extent of the tray 74 immediately above, thus permitting the cascade issuing from this tray to be received on the partition 86. The opposite end of partition 86 is provided with an opening 91 (see Figures 1 and 3) at one side thereof, through which the calcium chloride solution flows into the reservoir 78. A plurality of staggered baffles 93' (Figure 3) extend longitudinally of the reservoir 78 between the passes of the tortuous cooling unit 80. The opening 91 permits the calcium chloride to enter the reservoir 78 at one extreme side of the apparatus where it is obliged to flow along the tortuous path provided by the baffles 93' to a point of discharge at the other side of the same and thereby flow counter-current to the cooling water or other liquid which enters the serpentine coil 80 at 82. An overflow outlet 90 (Figures 1, 3 and 6) is provided for the reservoir 78 above the level of the immersed cooling unit 80. This outlet is so positioned that the immersed cooling unit 80 is completely submerged in the calcium chloride solution.

In passing through the cascades, the air entrains a portion of the calcium chloride solution and throws the same against the walls of the casing, thus wetting the same. The wetted surface of the liquid phase drying zone is thus materially increased in area which is conductive toward greater moisture absorption in this zone. To prevent droplets of the calcium chloride solution being carried by the air into the first compartment 38 of the solid phase drying zone 28 and causing premature liquefaction of the solid calcium chloride in the first compartment, the cascade issuing from the uppermost tray 74, is divided by a lip 76' (Figures 2, 6 and 13) provided on the top tray 74, which lip divides the cascade issuing from this tray and provides a comparatively large opening through the cascade centrally thereof through which the air may pass unobstructed. During its passage from the cascade issuing from the tray 74 immediately below the uppermost tray to the screen 45, the entrained particles of calcium chloride solution contained in the air have an opportiunity to settle out so that when the air reaches the screen 45 it is substantially free from droplets of calcium chloride solution.

The air stream passing beneath the uppermost tray 74 is prevented from passing between this tray and the bottom of the solid phase drying zone by virtue of the baffles 64, 66, 68 and plate 70, and enters the solid phase drying zone, passing through the compartments 38, 40 and 42 to be further dehumidified in the manner outlined above. The arrangement of the upper tray 74 and baffles 64, 66, 68 and plate 70 is such that there will be free and unobstructed drainage of the material liquefied in the solid phase drying zone compartments 38, 40 and 42 through the screen bottoms 62. The concentrated calcium chloride solution which drains through these screens 62 drips into a comparatively dilute solution of calcium chloride circulated over the uppermost tray 74 and thus resolidification of the concentrated solution on the upper tray 74 is prevented. At the same time the uppermost tray 74 prevents the air from circulating along the bottom of the beds 38, 40 and 42 and chilling or causing congelation of the liquefied calcium chloride which forms in the beds and drips onto the top tray 74.

The screen openings of the screens 62 must be large enough to permit the flow of the viscous solution therethrough, but we prefer to use openings larger than such minimum so as to permit even solid particles of calcium chloride in the bottom of the compartments 38, 40 and 42, which have been reduced to small size by the liquefaction, to pass through the screens and onto the uppermost tray 74. For example, if the screen openings are ¼ inch to ½ inch in diameter provision is made for adequate solution drainage and furthermore, whenever particles of the solid deliquescent material which originally are preferably from 1 to 2 inches in diameter are reduced in size so that they will fall through these openings under the conditions prevailing in the bed, they are automatically removed from the bed and fall onto the uppermost tray 74. In this position, they are swept by the recirculating dilute solution and gradually dissolve.

During the operation for dehumidification, liquefied calcium chloride is constantly withdrawn from the reservoir 78 and pumped to the top tray 74 in a manner hereafter described to maintain a constant circulation of calcium chloride solution over the trays 74.

When the apparatus is used for humidifying air, as for example, in winter, the liquid phase drying zone is converted into humidifying zone, while the solid phase drying zone 28 is converted into a heating and/or mixing zone for heating saturated air issuing from the humidifying zone and/or mixing with air which is withdrawn from the enclosed space. Accordingly, the masses of calcium chloride remaining in the machine are taken out of the compartments 38, 40 and 42 in the solid phase drying zone and all of the calcium chloride solution in the liquid phase drying zone, including the liquid on the trays 74 (which are provided with small drainage holes for the purpose), the partition 86, and the reservoir 78, is removed. The apparatus is then ready for humidifying air by circulating heated water over the trays 74 and the partition 86. The heat exchanging units 47 and 52 may be used to heat the air which has been humidified by circulation over the hot water on the trays 74 so as to reduce its relative humidity to a point at which condensation of water in the ducts or at the outlets is avoided. The units 52 and 47 are preferably used in series with the water circulated over the trays 74, and the water in this circuit heated by means of an external heater 278 (Figure 11) of the ordinary household type. It is also possible to heat the water which is applied to the trays 74 by such a heater and have the heat exchanging units 52 and 47 remain inoperative.

In winter use air is introduced into the lower compartment 30 or humidifying zone through the inlet 32, and being drawn by the action of the blower 36, flows above and below the partition 86 and follows the tortuous path provided for it by the staggered trays 74. The air in thus crossing the cascades and in being exposed to large surfaces of heated water, absorbs moisture and enters the heating or mixing zone 28 in a nearly saturated condition.

A short conduit section 94 having a damper 96 therein, extends from the air chute 33 and communicates with the mixing or heating zone. Air may be introduced through this conduit and mingled with the nearly saturated air issuing from the humidifying zone and the mixed air is passed through the heat exchangers 47 and 52 and discharged from the apparatus through the outlet 34, or, if desired, the damper 96 may be left closed and the humidified air only heated by passage through the heat exchangers 47 and 52. The heating or mixing reduces the relative humidity of the air issuing from the apparatus to a point considerably below the saturation point and thus prevents condensation. Provision is made whereby heated water may be passed, first through the heating unit 52 and subsequently through the unit 47, to be discharged on the uppermost tray 74 at a reduced temperature, from whence it flows downwardly in cascade fashion into the reservoir 78 for recirculation through the heating unit and back to the heat exchanging units 52 and 47. By passing the heated water through the heat exchanging units first, the air is heated after it has been humidified thereby reducing its relative humidity which under certain conditions permits the closing of damper 96 and eliminates the introduction of unhumidified air at this point. In this method of effecting humidity and heating, the submerged heat exchange unit 80 is not used.

The operating devices and connections such as conduits, valves, pumps, motors, and other instrumentalities for causing the apparatus to function both for winter and summer use, are enclosed within a casing 85 which is secured to the casing 10. The casing 85 is provided with a door 83 through which access may be had to these parts. The blower 36 is supported within this casing and draws conditioned air from the casing 10 and discharges it into an outlet sound absorption chamber 87 which may be lined with sound absorbing material or employ suitable baffles for this purpose. This sound absorption chamber may be provided with one or more outlets 89 which are connected by conduit sections 91 to the various rooms or parts of the enclosed space to be conditioned.

Referring now to Figures 1, 3, 6 and 7, a pump is designated at 100. Means is provided whereby this pump may be utilized to circulate the calcium chloride solution in the reservoir 78 over the trays 74, and toward this end, the intake or pump inlet 102 is connected by means of conduit sections 104, 106 and 108 to the interior of the reservoir 78 at a point below the bottom thereof by an elbow fitting 110.

The discharge or pump outlet 112 is connected by means of conduit sections 114, 116 to a three way valve 118 which normally directs the solution being pumped to the top tray 74 of the liquid phase drying zone 30 through conduit sections 120, 122 which latter section passes through the wall of the casing 10 into the interior of the same and terminates in a header nozzle 124 above the uppermost tray 74. The solution discharged upon the upper tray 74 receives the concentrated calcium chloride solution and any small lumps of solid calcium chloride dripping from the beds 38, 40 and 42 in the solid phase zone 28 and the resultant solution passes downwardly from tray to tray in the manner previously described and returns to the reservoir 78 for recirculation.

In order to cool the calcium chloride solution in the reservoir 78, means is provided for circulating cold water or other cooling medium from a source of supply, as for example, the city water main, cold well or the like, through the immersed cooling unit 80. In some installations where a greater cooling is desired, artificially cooled water, brine or other cooling fluids may be circulated through the immersed cooling unit 80. For example, cold water is conducted from a source of water supply (not shown) through conduit section 126, solenoid valve 128 (Figure 10), conduit section 130, gate valve 132 and conduit section 134 to the inlet 82 of the immersed cooling unit 80 in the reservoir 78. Water thus introduced into the immersed radiator 80 is circulated through the tortuous path provided by the tubes thereof to the outlet 84.

The cooling medium entering the submerged cooling unit 80 travels through the tortuous paths of this radiator in a direction opposed to the flow of calcium chloride solution following the tortuous path 93 between the baffles 93' in the reservoir 78. The calcium chloride solution is therefore progressively cooled as it travels toward the outlet provided by the elbow fitting 110.

The heat exchange units or coolers 47 and 52, contained within the solid phase drying zone 28, are connected in series with each other and with the immersed cooling unit 80. Cooling water issuing from the outlet 84 of the immersed cooling unit 80 is carried upwardly through a vertical riser 136 (Figures 1 and 8), conduit sections 138, and enters the cooling unit 52 through an inlet 139 in the bottom thereof. The water or other cooling fluid is circulated through this unit and emerges from the outlet 140 at the top thereof from whence it is carried through the conduit 142 to the inlet 146 of the cooling unit 47. The water or other cooling medium after being circulated through the cooling unit 47, passes through the outlet 148 thereof, through the conduit 150 (see Figures 1 and 7) to a three way valve 155 (Figure 6) (which has a winter use) and through a conduit 152 from whence it may be discharged to the sewer or the water may be used for other purposes since it is not contaminated in any way.

The cooling units 80, 47 and 52 have been shown and described as being connected in series. They may however, be connected in parallel when desired.

In order to discharge the excess calcium chloride solution which collects in the reservoir 78, a small capacity pump 220 (Figures 3, 6 and 7) has its inlet 222 connected through conduit sections 224, 226, to the overflow 90 from the reservoir 78. The excess solution is thus carried through the pump 220 to the outlet 227 thereof and discharged through a pipe line 228 (Figure 11) to the top of a storage tank 229 through an enlarged header 233 having a sight glass 231 and a valve 237 therein. A conduit 239 communicates with the header 233 above the valve 237 and this conduit communicates with the sewer or other point of discharge for waste material. By closing the valve 237, all of the calcium chloride solution issuing from the reservoir may be discharged to waste and by leaving the valve 237 open, the storage tank 229 is permitted to receive the solution until its capacity has been reached when the solution will automatically flow to waste through the conduit 239.

The solenoid or other remote control valve 128 (Figures 6, 7, 8 and 10) in the line 126, 130, 134 leading from the source of cold water supply to the immersed cooling unit 80 is automatically operated to permit circulation of cooling water through the cooling units 80, 52 and 47 or to prevent such circulation, depending upon the temperature of the conditioned air leaving the apparatus. A thermostat 180 (Figures 11 and 12), having terminals 181 and 183 is located in the outlet chamber 87. The terminal 181 is electrically connected by a lead $a$ to one terminal 186 of the solenoid valve 128. The other terminal 183 of the thermostat 180 is connected by a lead $b$ to a relay 238. A lead $c$ connects the other terminal 188 of the solenoid valve 128 to the relay. The relay 238 is designed to supply electrical current through lead $b$, thermostat 180, lead $a$, solenoid valve 128 and back through lead $c$, in such a manner that, when a predetermined temperature is reached in the outlet chamber 87, the thermostat 180 closes the circuit just described so that the solenoid valve opens to permit cooling water to pass through the same. Conversely, when the temperature in the outlet chamber 87 drops below a predetermined degree, the solenoid valve is permitted to close and prevent the passage of cooling water therethrough until the temperature of the discharged air again rises to a point where cooling is desirable.

One form of solenoid valve 128 which may be used is shown in detail in Figure 10, although any suitable electrically or temperature controlled valve may be used. In the form shown a housing 190 has a valve chamber 192 therein provided with an inlet 194 and an outlet 196. A web 198 extends across the chamber 192 and is provided with a valve seat 200 adapted to normally be closed by a valve 202 carried by a movable core 204 which is slidably mounted within the casing 190. In order to maintain the valve 202 on its seat, a spring 206 serves to normally urge the core and valve downwardly against the seat. Positioned within the housing 190 and surrounding the core 204 is a magnetic coil 208 which is normally de-energized but which, when energized, causes the core to be moved upwardly to lift the valve 202 from its seat to permit cooling water to flow through the housing 190. The upper end of the housing 190 is provided with a threaded opening 210 in which there is threadably received a plug 212 of insulating material which carries the terminals 186 and 188 for the coil 208. A sheath 216 has one end thereof threadably received in the opening 210 and the leads a and c extend through the sheath 216 and connect the terminals 186 and 188 with the terminal 181 of the thermostat 180 and with the relay 238 respectively.

The pump 100 and the pump 220 are designed to be driven in unison from the common shaft 230 of an electric motor 232. The blower 36, which draws air through the apparatus, is likewise driven by an electric motor 234 (Figures 1 and 12). When it is desired to reduce the humidity of air within the enclosed space, the motors 232 and 234 are automatically started by the operation of the humidostat 236, and when the humidity reaches a predetermined degree, both pumps 100 and 220 and the blower 36, are automatically caused to cease their operation, while at the same time the thermostatic control of the solenoid valve 128 is over-ridden so that this valve closes, and the entire apparatus remains at a standstill.

The motors 232 and 234 which control the operation of the blower 36 and of the pumps 100 and 220 respectively receive current from the relay 238 through the respective leads d and e and f and g. The humidostat 236 positioned within the enclosed space and operating on a reduced voltage circuit h—i from the line x—y has one terminal 158 connected through a switch 241 to the relay 238 by means of the lead i while the other terminal 156 is connected through the switch 241 to the lead h.

When the humidostat 236 is set for example for a relative humidity of 40 to 42, if the actual humidity in the enclosed space is above this setting, the contacts of the humidostat remain closed, the relay 238 is energized and contact 238a is held against contact 238b to complete the circuit from the lines x—y through the motors 232 and 234 and the solenoid valve 128 to cause the motor 232 to operate the blower 36 to draw air through the apparatus, the motor 234 to operate the pump 100 to pump the liquid calcium chloride, and the valve 128 to remain open if the thermostat 180 so provides to permit cooling water or other fluid to circulate through the heat exchange units 80, 52 and 47.

When the relative humidity in the enclosed space is reduced below that for which the humidostat 236 is set, the contacts of the humidostat will open, current through the relay 238 will be broken and contact 238a will separate from contact 238b to interrupt the current and stop the motors 232 and 234 and permit the valve 128 to close until the humidostat 236 again calls for operation of the dehumifying apparatus.

In the winter use of the apparatus for humidifying and heating the air, the humidostat 236 is caused to start the operation of the motors 232 and 234 when the humidity falls below the setting of the humidostat and to stop the operation of the motors 232 and 234 and permit the valve 128 to close when the humidity equals or rises above the setting of the humidostat 236. For this result the switch 241 is caused to connect the leads h and i of the relay circuit to the terminals 156 and 154 of the humidostat 236. The humidostat 236 is set to open its contacts if the relative humidity exceeds the predetermined setting, for example 40. The humidostat will then conduct current through the leads h and i only when the humidity in the space undergoing conditioning is below the setting of the humidostat and under this condition the motors 232 and 234 will operate to cause the blower 36 to draw air through the apparatus and the pump 100 to pump heated water through the heat exchange units 52 and 47 over the trays 74 in the manner previously described. When the humidity in the enclosed space reaches the predetermined relative humidity for which the humidostat 236 is set the contacts of the humidostat are automatically broken which breaks the circuit through the relay 238 and causes the operation of the motors 232, 234, etc., to cease.

Inasmuch as the initial deliquescence of the solid calcium chloride in the compartments 38, 40 and 42 is comparatively slow in starting the apparatus for summer use, it is advisable to flood the trays 74 in the liquid phase zone by pumping some of the solution of calcium chloride from the storage tank 229 to these trays. Accordingly, a conduit 242 (Figures 6 and 11), leading from the storage tank 229 communicates with the suction line 106, 104 of the pump 100 through a conduit 244 and a three way valve 246. The valve 246 is adjusted to close the conduit 108 leading to the reservoir 78 to permit the calcium chloride to flow from the storage tank 229 through the circuit just described to the uppermost tray 74 through the conduit sections 120, 122. This fluid circuit is maintained until such time as the reservoir 78 is filled at which time the valve 246 is adjusted to exclude the conduit section 244 from the suction line 108, 106 of the pump 100, and to open the line from the reservoir 78 which leads to the pump 100 through the conduit sections 108, 106 and 104. The reservoir 78, being filled, the pump 100 during periods of operation circulates the solution over the trays in the manner previously described.

After the apparatus has been in use as a dehumidifier during the summer and it is desired to cease further operation of the same until the winter season sets in, when the apparatus is to be then converted to use as a humidifier, certain operations are carried out to prepare the apparatus for this purpose.

Any solid calcium chloride material remaining in the compartments 38, 40 and 42 in the solid phase drying zone 28, is removed and subsequently the calcium chloride solution in the reservoir 78 is pumped either to the storage tank 229 or into a tank truck or the like.

Accordingly, a conduit 256, communicating with the conduit sections 114, 116, and leading to one branch of a three way valve 258, communicates through a conduit 260 and a gate valve 262 with an outlet 264 which may discharge into a tank truck. By properly adjusting the valve 246 to exclude the conduit 244 from the suction line of the pump 100, by operating the valve 118 to exclude the conduit 120, by adjusting the valve 258 to cause communication of the conduit sections 256 and 260, and by opening the gate valve 262, the pump 100 may be caused to withdraw calcium chloride solution in the reservoir 78 through the elbow fitting 110, conduit section 108, valve 246, conduit sections 106 and 104, pump 100, conduit sections 114 and 256, valve 258, conduit section 260, and gate valve 262 to the outlet 264 leading to said tank truck.

In order to conduct the calcium chloride in the reservoir 78 to the storage tank 229, the three way valve 258 has a branch communicating with a conduit section 266 which in turn communicates with the conduit section 242, leading to the storage tank 229. By leaving the adjustment of the valves 246 and 118 the same as when the calcium chloride is carried to a tank truck, and by adjusting the valve 258 to cause intercommunication between the conduit sections 256 and 266, the pump 100 may be operated to withdraw calcium chloride solution from the reservoir 78 through the conduit section 108, valve 246, conduit sections 106 and 104, pump 100, conduit sections 114 and 256, valve 258, and conduit sections 266 and 242 to the storage tank 229.

It will be seen therefore that the valve 258 may be operated to divert the solution issuing from the reservoir 78 either to the said tank truck or to the storage tank 229.

In using the apparatus in winter as a humidifier, for the purpose of illustration, it may be assumed that the solid calcium chloride in the compartments 38, 40 and 42, together with the calcium chloride solution in the trays 74, the partition 86, and the reservoir 78 has been removed and that both the solid phase drying zone and the liquid phase drying zone are empty. It will be remembered that the solid phase drying zone is converted into a mixing or heating zone and that the liquid phase drying zone is converted into a humidifying zone for direct contact of the air with the heated water.

The thermostat 180 is set for its minimum temperature and therefore the solenoid valve 128 which it controls remains open. Thus in the winter use of the apparatus, the thermostat in effect is rendered inoperative as a control instrument, except as it is over-ridden by the humidostat 236, and the solenoid valve 128 remains open throughout the use of the apparatus as a humidifier.

The leads h and i of the humidostat 236 are reversed upon the terminals 154 and 158 by throwing the polarity reversing switch 241 so that when the relative humidity of air in the enclosed space falls below a predetermined setting, the humidostat 236 closes the circuit through the relay 238 to cause the motors 232 and 234 to operate the pump 100 and the blower 36 and to cause the valve 128 to open. The gate valve 132 is closed and the needle valve 268 is fully opened while at the same time, the valve 118 is adjusted to establish communication between the conduit sections 114, 116 and a conduit section 276 leading to a heater 278. As the apparatus is started, water is then caused to flow from the water main through the conduit section 126, solenoid valve 128, conduit section 130, needle valve 268, conduit sections 267 and 104, pump 100, conduit sections 114 and 116, valve 118, and conduit section 276 to the heater 278. After being heated, the water thus introduced to the heater 278 passes through conduit sections 280 and 282, to a T 284 (Figures 1 and 6) disposed in the vertical riser 136, and from thence to the heat exchanger units 52 and 47 in the order named. After leaving the heat exchanger unit 47, the water which has lost a portion of its heat to the air passing through the heating and mixing zone 38, passes through the conduit 150 to the valve 155 and through conduit sections 157 and 122 to the nozzle 124 where it is discharged onto the uppermost tray 74 for humidification of air in the humidifying zone 28 as previously described.

When the water thus admitted to the trays 74 finds its way into the reservoir 78 and this reservoir becomes filled, the needle valve 268 is adjusted so that a limited amount of water, slightly in excess of the deficiency created by evaporation in the humidifying zone 30, is permitted to pass through the conduit section 267 to the intake line 104 of the pump 100, the excess water serving to carry away salts that may be formed upon evaporation in the apparatus. The valve 246 is then adjusted to establish communication between the conduit sections 108 and 106. The pump then operates to withdraw the water in the reservoir 78 and pump it through the circuit previously described leading from the pump 100 to the heater 278. During the use of the apparatus as a humidifier, the flow of water from the reservoir 78 through the heater 278 and heat exchanging units 52 and 47 to the uppermost tray 74 is continuous.

As an alternative method of effecting humidification, means is provided whereby water may be circulated from the reservoir to the heater 278 and from there directly to the uppermost tray 74, the heat exchanger units 52 and 47 remaining inoperative. Toward this end a three way valve 286 is interposed in the line leading from the heater 278 to the heat exchanger unit 52. Conduit sections 288 and 290 lead from the valve 286 to the valve 155 and thus water may be pumped continuously from the reservoir 78, through conduit sections 108, 106, 104, pump 100, conduit sections 114, 116, valve 118, and conduit section 276 to the heater 278. From the heater, the water is sent to the uppermost tray 74 through conduit section 280, valve 286, conduit sections 288 and 290, valve 155, conduit sections 157 and 122 and nozzle 124. In winter the overflow pump 220 serves to carry away the excess water added above that required for humidification.

While we have described in considerable detail a preferred embodiment of our invention it will be readily understood that various modifications and changes may be made therein and equivalents used for various of the parts specifically described, without departing from the principles of our invention or the scope of the appended claims.

We claim:

1. In an air conditioning apparatus having a solid phase drying zone, comprising a plurality of compartments containing solid calcium chloride, heat exchange units separating said compartments, means to circulate air through said compartments to remove moisture therefrom and through said heat exchange units, means to circulate a cooling fluid through said heat exchange units to remove heat from the air, and means controlled by the temperature of the air to start and stop the flow of cooling fluid through said heat exchange units.

2. In an air conditioning apparatus having a solid phase drying zone, comprising a plurality of compartments containing solid calcium chloride, heat exchange units separating said compartments, means to circulate air through said compartments to remove moisture therefrom and through said heat exchange units, means to circulate a cooling fluid through said heat exchange units to remove heat from the air, means controlled by the temperature of the discharged air to start and stop the flow of cooling fluid through said heat exchange units, and means controlled by the humidity of the air in the conditioned space to start and stop the circulation of air through said apparatus.

3. In an air conditioning apparatus, a solid phase drying zone comprising a plurality of longitudinally spaced compartments containing solid calcium chloride, said compartments having perforate bottoms occupying substantially the same horizontal plane, means for passing air to be dehumidified successively through said compartments, cooling units disposed between adjacent compartments for removing the latent heat of condensation of moisture removed from the air together with the heat of solution of the calcium chloride, a pool of calcium chloride solution extending underneath said bottoms and being substantially coextensive therewith and into which calcium chloride solution resulting from the deliquescence of solid material in said compartments is adapted to drain, and baffles extending downwardly from each cooling unit into said pool, and a baffle extending downwardly from the forward edge of the first longitudinal compartment into said pool, said baffles serving to exclude the passage of air between said pool and the bottoms of said compartments.

4. An air conditioning apparatus comprising in combination a casing containing a solid phase drying zone and a liquid phase drying zone, said solid phase drying zone comprising a plurality of adjacent compartments containing solid calcium chloride, said compartments having perforate bottoms, said liquid phase drying zone comprising a plurality of superimposed staggered trays beneath said compartments, the uppermost tray being substantially coextensive with the bottoms of said compartments and being adapted to receive thereon a pool of calcium chloride resulting from the deliquescence of solid material in said compartments, said uppermost tray being adapted to overflow said solution onto the next adjacent tray and from said latter tray downwardly from tray to tray in cascade fashion, means for admitting air into said casing below said trays, means for drawing the air upwardly over the surfaces of said trays into the solid phase drying zone and successively through said compartments, means for collecting the calcium chloride solution issuing from the lowermost tray and for recirculating the same over said trays, and means for excluding air from passing over the surface of said pool on the uppermost tray whereby air is forced to pass successively through said compartments.

5. In an air conditioning apparatus a plurality of horizontally spaced compartments containing calcium chloride in lump form, means for passing air successively through said compartments for the purpose of dehumidification thereof, cooling units interposed between adjacent compartments and adapted to cool the air passing from one compartment to the next, a screen supporting the leading face of calcium chloride in the first compartment, a screen on each side of each cooling unit for supporting the adjacent faces of calcium chloride in the compartments and for preventing contact of the calcium chloride with said cooling units, and a screen for supporting the rear face of calcium chloride in the last compartment, said compartments having removable screen bottoms with openings which permit the concentrated calcium chloride solution and small particles of calcium chloride produced by deliquescence of said lumps to drop from said compartments.

6. The combination with an air conditioning apparatus having a solid phase drying zone adapted to contain solid calcium chloride, of a liquid phase drying zone comprising a series of superimposed trays, the uppermost tray being adapted to receive thereon a solution of calcium chloride resulting from the deliquescence of the solid calcium chloride in said solid phase drying zone, each of the remaining trays being adapted to receive the solution thereon successively by overflow of the solution from the tray above, a reservoir beneath said trays, a partition above said reservoir and below said trays, said partition being in the form of a tray adapted to receive the solution issuing from said trays thereon, there being an opening through said partition adjacent one edge thereof through which the solution thereon flows into said reservoir at one side thereof, means for withdrawing the solution from said reservoir at the other side thereof whereby the same is caused to flow across said reservoir, means for conducting the withdrawn solution to the uppermost of said trays for recirculation over said trays and partition, means for progressively cooling the solution in said reservoir in its flow thereacross, means for introducing air into said liquid phase zone, and means for passing the air thus introduced over the surfaces of the trays and through the solid phase drying zone.

7. In an air conditioning apparatus comprising a liquid phase drying zone wherein the air is contacted with a solution of moisture absorbing material, a reservoir containing a solution of said material, means for conducting air over and in contact with the surface of the solution in said reservoir, means for introducing the solution to said reservoir at one end thereof, means for withdrawing the solution from the reservoir at the other end thereof, a plurality of staggered baffles extending across said reservoir for causing the liquid to flow in a tortuous path across the reservoir, a cooling unit submerged in said reservoir and comprising a continuous tubular conduit following the tortuous path provided by said baffles, and means for passing a cooling medium through said unit in a direction opposed to the direction of flow of said liquid.

8. The combination with an air conditioning apparatus having a solid phase drying zone including a plurality of beds for solid calcium chloride, a liquid phase drying zone including a plurality of trays for supporting pools of liquid calcium chloride solution, means for directing air to be dehumidified successively over the surfaces of said pools and then successively through solid calcium chloride in said beds, and a reservoir adapted to receive calcium chloride solution draining from said trays, said reservoir having an overflow outlet, of a storage tank for calcium chloride solution, a pump having a relatively large capacity, and having a fluid inlet and a fluid outlet, a conduit communicating with the bottom of said reservoir and with the inlet of said pump, a second conduit communicating with the outlet of said pump and having a discharge opening for discharging calcium chloride solution onto said trays, a second pump having a relatively small capacity and having a fluid inlet and a fluid outlet, a conduit communicating with said overflow outlet and with the fluid inlet of said last mentioned pump, and a conduit leading from said last mentioned fluid outlet to said storage tank.

9. The combination with an air conditioning apparatus having a mixing zone, a humidifying zone including a plurality of trays for supporting pools of water, means for directing air to be humidified successively over the surfaces of said pools and into said mixing zone, means for introducing air into said mixing zone for admixture with the air issuing from said humidifying zone, and a reservoir for receiving water issuing from said trays, of a pump having an inlet and an outlet, a conduit leading from a source of water supply to said pump inlet, a needle valve in said conduit, a water heater having an inlet and an outlet, a conduit leading from said pump outlet to the inlet of said water heater, a conduit leading from the outlet of said heater to said humidifying zone for supplying water to said trays, and a by-pass conduit having a valve therein for connecting said last two mentioned conduits and excluding said heater.

10. A combination with an air conditioning apparatus having a solid phase drying zone, a liquid phase drying zone, means for directing air to be dehumidified successively through said zones, a reservoir adapted to receive hydroscopic solution draining from said liquid phase drying zone, said reservoir having an overflow outlet, of a storage tank for hygroscopic solution, a pump having a relatively large capacity, and having a fluid inlet and a fluid outlet, a conduit communicating with the bottom of said reservoir and with the inlet of said pump, a second conduit communicating with the outlet of said pump and having a discharge opening for discharging hygroscopic solution into said liquid phase drying zone, a second pump having a relatively small capacity and having a fluid inlet and a fluid outlet, a conduit communicating with said overflow outlet and with the fluid inlet of said last mentioned pump, and a conduit leading from said last mentioned fluid outlet to said storage tank.

11. In an air conditioning apparatus a plurality of horizontally spaced compartments containing calcium chloride in lump form, means for passing air successively through said compartments for the purpose of dehumidification thereof, cooling units interposed between adjacent compartments and adapted to cool the air passing from one compartment to the next, a screen supporting the leading face of calcium chloride in the first compartment, and a screen for supporting the rear face of calcium chloride in the last compartment, said compartments having removable screen bottoms with openings which permit the concentrated calcium chloride solution and small particles of calcium chloride produced by deliquescence of said lumps to drop from said compartments.

CHARLES R. DOWNS.
JOSEPH W. SPISELMAN.